United States Patent [19]

Gajewski et al.

[11] 4,140,162
[45] Feb. 20, 1979

[54] CLEAR, AUTOCLAVABLE PLASTIC FORMULATION FREE OF LIQUID PLASTICIZERS

[75] Inventors: Henry M. Gajewski, Winnetka; Paul E. Measells, Libertyville; Dean G. Laurin, Lake Zurich; Leonard F. Czuba, Lombard, all of Ill.

[73] Assignee: Baxter Travenol Laboratories, Inc., Deerfield, Ill.

[21] Appl. No.: 819,924

[22] Filed: Jul. 28, 1977

[51] Int. Cl.$^2$ .................. B65D 37/00; C08L 53/00
[52] U.S. Cl. .................. 150/1; 260/45.75 R; 260/876 B
[58] Field of Search .................. 150/1; 260/876 B

[56] References Cited

U.S. PATENT DOCUMENTS

| 3,597,499 | 8/1971 | Daumiller et al. ............ 260/876 B |
| 3,686,364 | 8/1972 | Robinson et al. ............ 260/876 B |
| 3,865,776 | 2/1975 | Gergen ............ 260/876 B X |
| 3,894,117 | 7/1975 | Agouri et al. ............ 260/876 B |
| 4,000,341 | 12/1976 | Matson ............ 260/876 B X |

Primary Examiner—Thomas de Benedictis, Sr.
Attorney, Agent, or Firm—Paul C. Flattery; John P. Kirby, Jr.; Garrettson Ellis

[57] ABSTRACT

A clear, autoclavable, blow-moldable plastic formulation for medical and other uses comprises a two, or optionally three, component system including (1) a polyolefin consisting of propylene units as a first component, (2) a block copolymer having thermoplastic rubber characteristics with a central block of ethylenebutylene copolymer and terminal blocks of polystyrene, and (3) an optional third ingredient comprising a softening agent of polyethylene or poly(ethylene-vinyl acetate), which is particularly desirably used if the thermoplastic rubber copolymer has a molecular weight of more than 70,000. The formulation is essentially free of liquid plasticizers.

13 Claims, 2 Drawing Figures

CLEAR, AUTOCLAVABLE PLASTIC FORMULATION FREE OF LIQUID PLASTICIZERS

BACKGROUND OF THE INVENTION

This application relates to a plastic formulation which is particularly contemplated for use in blood-containing bags, tubing, and the like, as well as for medical solution containers and tubing. However, it is also contemplated that the plastic formulation can be used generally in flexible containers and objects of various kinds having the advantage of being autoclavable at sterilizing temperatures, being blow moldable, and being transparent, if desired.

The materials exhibit the particular advantage of being soft and flexible despite the presence of various polymer units such as propylene and styrene units which are associated with harder materials. Also, the formulation is preferably essentially free of liquid plasticizers such as dioctylphthalate, mineral oil, or the like. Accordingly, when used, for example, to fabricate blood bags, a very low level of leaching of materials from the plastic into the blood is achieved.

Furthermore, as another factor rendering this material particularly suitable for medical use, it is free of nitrogen-containing polymer units, and potentially toxic hydrolyzable units in general, so that very few undesirable low molecular weight materials are formed during autoclaving or other high temperature experience of the formulation. The formulation of this invention is compatible with blood, and appears to exhibit no increase in toxic effect on blood cells.

DESCRIPTION OF THE INVENTION

In accordance with this invention a clear, flexible plastic formulation is provided, such plastic being capable of being blow molded and autoclaved. The formulation comprises:

(A) from 10 to 40 percent by weight of a polyolefin consisting essentially of propylene units;

(B) from 40 to 85 percent by weight of a block copolymer having thermoplastic rubber characteristics, and consisting essentially of (1) a central block, comprising 50 to 85 percent by weight of the copolymer molecule, of a rubbery olefin polymer of generally equal proportions of ethylene and butylene units, and (2) terminal blocks of polystyrene; and (C) from 0 to 40 percent by weight of a softening agent selected from the group consisting of polyethylene, poly(ethylene-vinyl acetate) containing no more than 35 weight percent of vinyl acetate units, and poly(ethylene-propylene) containing no more than 60 percent by weight of propylene units.

Preferably, there should be at least about 15 percent by weight of ingredient (A) present. Also, it is preferable for the plastic formulation to be essentially free of liquid plasticizers.

It is also preferred for an effective, trace amount of an antioxidant to be present, particularly a hindered phenolic antioxidant. For example, referring to the formulation above, from 0.05 to 0.2 percent by weight of antioxidant would generally be a preferred amount.

It has been particularly found that an effective, trace amount, such as an amount in the range mentioned immediately above of the antioxidant: 1,3,5-trimethyl-2,4,6-tris (3,5-di-tert-butyl-4-hydroxybenzyl) benzene has been found to be a particularly effective antioxidant in the formulation of this invention. Studies have shown that this antioxidant is practically non-leachable in the presence of blood. Also, this antioxidant is essentially non-hydrolyzable at autoclaving temperatures, preventing the breakdown of the material into lower molecular weight substitutes which might be more leachable into the blood.

The above antioxidant is commercially available from the Ethyl corporation at the present time under the product number AO330.

Another antioxidant which can be used under appropriate circumstances is tetrakis[methylene-3-(3',5'-di-tert-butyl-4'-hydroxyphenyl) propionate] methane, which is sold under the name IRGANOX 1010 by the Ciba-Geigy Company. This material, however, is somewhat subject to hydrolysis across its ester linkages at autoclaving temperatures.

Ingredient (A) as described above may be a polyolefin consisting essentially of propylene units and preferably having a melt index (according to ASTM D-1238, using condition L) of generally of 1.5 to 3. Many commercial varieties of this material may contain small amounts of ethylene units, for example up to about 10 percent, without making a major impact on the properties of the polypropylene material. This polypropylene ingredient provides resistance to heat generally, and specifically to the stress of autoclaving, to the formulation, with the formulation increasing in stiffness with increasing amounts of the polypropylene material.

Ingredient (B) is commercially available under the trademark KRATON G from the Shell Chemical Company. Other rubbery block copolymers utilize a central block of butadiene or isoprene, rather than the preferred ethylene butylene copolymer units utilized herein. However, while these substitute materials might be contemplated for use in certain circumstances as equivalents to the ethylene butylene copolymer block, the materials of this invention containing the ethylene butylene copolymer block are generally preferred for their improved physical characteristics and the like. These materials, having a molecular weight of preferably about 50,000 to 120,000 for the purposes of this invention, exhibit the characteristics of a thermoplastic rubber, due to the combined effects of the central block of the molecule, which is typically rubbery, olefinic material, and the terminal blocks of thermoplastic polystyrene.

The above two ingredients (A) and (B) can be used alone to make formulations in accordance with this invention, particularly when the molecular weight of ingredient (B) is no more than about 70,000. Above the molecular weight of 70,000, the resulting two component formulations may be excessively stiff for some purposes specifically contemplated in this invention, but are useable for other purposes.

For higher molecular weight materials, for example, when ingredient (B) has a molecular weight of about 100,000, it is particularly desirable to utilize about 10 to 40 parts by weight of ingredient (C), which may be a softer polyolefin such as polyethylene, or preferably a poly(ethylene-vinyl acetate) having from 10 to 35 weight percent of vinyl acetate units. For example, a poly(ethylene-vinyl acetate) material sold under the name CHEMPLEX 3315, sold by Chemplex Inc., having 28 weight percent of vinyl acetate units, is suitable for use herein as a softening agent or a melt flow aid to serve, in effect, as a solid and non-extractable plasticizer, to assist in the processability of the material during blow molding or the like. Alternatively, a poly(ethylene-propylene) containing no more than 60 percent by weight of propylene units may be used as a softening agent.

It is preferred for about 15 percent of ingredient (A), the polypropylene ingredient, to be present in the formulation as expressed above.

The separate ingredients of this invention may be conventionally formulated in the usual polymer blending equipment, for example a Banbury mixer or the like. After blending to obtain a homogenous mixture, it may be heated and extruded in conventional equipment to form a parison for blow molding of the desired containers, or otherwise processed in accordance with conventional techniques.

The following Examples are for illustrative purposes only, and are not for the purpose of limiting the invention of this application, which is as defined in the claims below.

EXAMPLE 1

A block copolymer having thermoplastic rubber characteristics consisting essentially of (1) a central block, comprising about 70 percent by weight of the copolymer molecule, of a rubbery olefin polymer of generally equal proportions of ethylene and butylene units, and (2) terminal blocks of polystyrene, was added to a rotational mixer in the amount of 80 parts by weight. The material used was KRATON G 1662, sold by the Shell Chemical Company, having a molecular weight of about 60,000.

To this was added 20 parts by weight of a polypropylene polymer having a melt flow of about 2, with a small amount of copolymerized ethylene (Rexene 23M2 sold by Dart Industries, Inc.).

Added with these two ingredients was an amount equal to 0.1 percent by weight of the formulation of the antioxidant sold by the Ethyl corporation under the tradename AO330 (described above). No liquid plasticizers were added.

The ingredients were pre-mixed in the rotational mixer, and then introduced into an extruder for extrusion into a rod. The rods were then chopped into smaller, pellet-sized pieces.

The chopped pellets were utilized in a commercially-available blow molding apparatus, specifically a continuous extrusion machine with a secondary blow station manufactured by Bekum Maschinen Fabriken Gmbh of Berlin, which was utilized to fabricate blood bags from the material. The material was found to be successfully fabricated into transparent, flexible, collapsible blood bags, which were autoclavable under a typical sterilizing cycle without an undue amount of distortion.

The blood bags were found to exhibit extremely low leachables upon being filled with blood and stored. Particularly, the antioxidant used was remarkably non-leachable into blood after the autoclaving step.

EXAMPLE 2

A polymeric blend of materials was made by adding to a rotational mixer (1) 20 parts by weight of a polypropylene used in Example 1; (2) 60 parts by weight of a poly(ethylene-butylene)-polystyrene copolymer having a molecular weight of about 100,000, with the middle ethylene-butylene block comprising about 70 percent by weight of the copolymer, and with terminal polystyrene blocks, and further containing the previously-described AO330 antioxidant (KRATON G 1660); and (3) 20 parts by weight of a poly(ethylene-vinyl acetate) copolymer having about 28 weight percent of vinyl acetate units (Chemplex 3315, sold by the Chemplex Company of Rolling Meadows, Illinois). The blended material was formulated to contain approximately 0.1 percent by weight of the AO330 antioxidant.

The material was blended in the rotational mixer, pelletized, and processed by blow molding into blood bags in the manner described previously in Example 1, to yield blood bags having similar desirable properties to those of the material of Example 1.

EXAMPLE 3

A plastic formulation was prepared from 60 percent by weight of the poly(ethylene-butylene) polystyrene block copolymer used in Example 2, in combination with essentially 40 percent by weight of the polypropylene copolymer utilized in Example 2. The formulation was processed in the manner previously described in Example 1 to form extruded material which was readily processable by blow molding, was autoclavable, had good clarity, and was flexible, although stiffer than the formulations of Examples 1 and 2.

EXAMPLE 4

A plastic formulation was prepared from 70 percent by weight of the poly(ethylene-butylene) polystyrene block copolymer used in Example 2, in combination with 20 percent by weight of the polypropylene copolymer utilized in Example 2, plus 10 percent by weight of the poly(ethylene-vinyl acetate) copolymer similar to that of Example 2.

The formulation was processed in the manner previously described in Example 1 to form extruded material which was readily processable by blow molding, was autoclavable, had good clarity, and was flexible, although somewhat stiffer than the formulation of Example 2.

EXAMPLE 5

A plastic formulation was prepared from 40 percent by weight of the poly(ethylene-butylene) polystyrene block copolymer used in Example 1, in combination with 20 percent by weight of the polypropylene copolymer utilized in Example 1, plus 40 percent by weight of a low-density polyethylene softening agent having a melt index (as defined in ASTM D1238 — condition L) of 1.9 and a density of 0.919 g/cc. (DuPont Alathon 20).

The formulation was processed in the manner previously described in Example 1, to form extruded material which was readily processable by blow molding, was autoclavable, and had acceptable but slightly reduced clarity from the formulations of Examples 1 and 2, and being slightly stiffer than those previously described formulations.

EXAMPLE 6

A plastic formulation was prepared from 70 percent by weight of the poly(ethylene-butylene) polystyrene block copolymer used in Example 2, in combination with 15 percent by weight of the polypropylene copolymer utilized in Example 1, plus 15 percent by weight of a low density polyethylene solid plasticizer having a melt index of 2 (tested as defined above) and a density of 0.918 g/cc. (Union Carbide DND4400).

The formulation was processed in the manner previously described in Example 1 to form extruded material having properties generally similar to the properties of the previous materials.

EXAMPLE 7

A plastic formulation was prepared from 50 percent by weight of the poly(ethylene-butylene) polystyrene block copolymer used in Example 1, in combination with 20 percent by weight of the polypropylene copolymer utilized in Example 1, plus 30 percent by weight of the polyethylene solid plasticizer utilized in Example 6.

The formulation was processed in the manner previously described in Example 1 to form extruded material having properties approximately similar to the formulation of Example 5.

EXAMPLE 8

A plastic formulation was prepared from 60 percent by weight of the poly(ethylene-butylene) polystyrene block copolymer used in Example 1, in combination with 10 percent by weight of the polypropylene copolymer utilized in Example 1, plus 30 percent by weight of a poly(ethylene-propylene) copolymer containing 75 percent by weight of ethylene units and having a melt index, measured as described above, of 0.5 (Vistalon 702, sold by Exxon Corporation).

The formulation was processed in the manner previously described in Example 1 to form extruded material having properties approximately similar to the formulation of that example.

Figure 1:
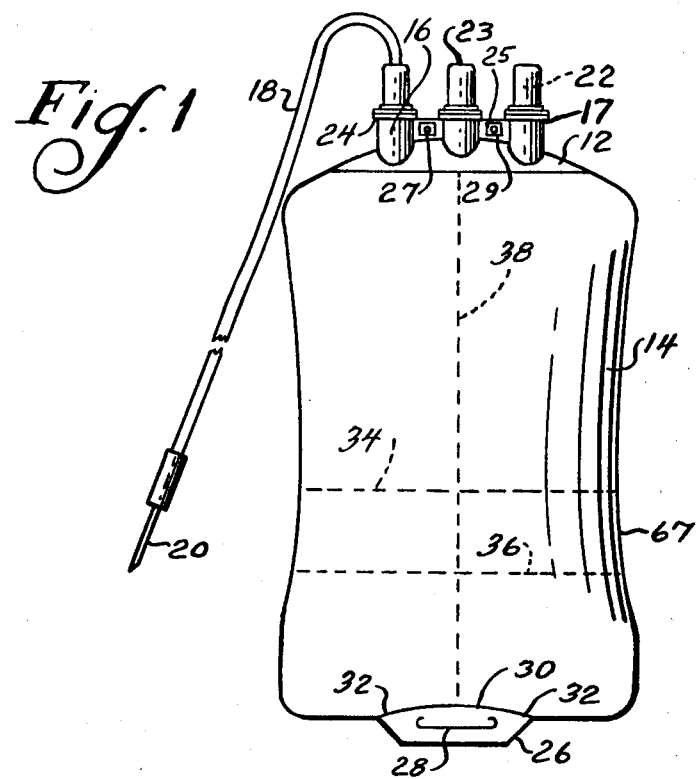
FIG. 1 is an elevational view of a blood bag which may be manufactured from a plastic formulation of this invention.

Referring to the drawings, blood bag 10 is illustrated defining a closed, flexible, collapsible container of generally oval cross section having a shoulder portion 12 with a wall thickness substantially thicker than the wall thickness of the remainder 14 of the sealed collapsible portion. Specifically, shoulder portion 12 may be from 0.2 to 0.1 inch thick, typically 0.16 inch, while the remaining portion 14 of bag 10 may range from 0.008 to 0.018 inch, for example 0.013 inch, with relatively little variation in wall thickness in different portions 14 of the container.

There is defined through shoulder portion 12 a plurality of spaced, upstanding tubular sleeves 16, 17 projecting outwardly from the end of the bag to provide communication to the bag interior. Sleeve 16, as shown, is connected to a donor tubing 18, which terminates in a conventional needle assembly 20, being connected to sleeve 16 in the manner shown in the co-pending patent application of David A. Winchell, et al., Ser. No. 705,319 filed July 14, 1976. The other sleeves 17 carry molded tubular structures 22, being heat sealed to the outer ends 24 of sleeves 16. The sleeves 17 define a sealing diaphragm across their bores which may be penetrated by a sterile needle for access.

Outside of structure 22 a closed port protector 23 is provided. Tubular structure 22 and port protector 23 may be of conventional structure. Structure 22, donor tubing 18, and protectors 23 may be added after molding of the bag 10.

Sleeves 16, 17 may be interconnected by thin web portions 25 integral with the sleeves. Web member 25 has a perforatable portion 27 defined therein, being perforatable because of the presence of the line of weakness 29 designed in the web member 25, the line of weakness being only about 0.001 or 0.002 inch thick and defining a closed, generally rectangular (or circular if desired) figure so that web member 27 may be punched out to permit the passage therethrough of alignment rods or a plasma extractor or other hanging and orienting members.

At the other end of container or bag 10 an integrally attached, flat tail seal and hanger portion 26 is provided, being defined with a perforatable slot 28, to permit penetration of a hanger rod or hook so that the bag may be hung in inverted position.

Hanger member 26 is shown to be longitudinally recessed toward the container 10 at its central portion 30 relative to the lateral portions 32 thereof. This permits the tucking of the hanger portion into the bulk of the bag during the centrifugation of the blood bag after collection of the blood has taken place.

It might also be added that, as an alternative embodiment to the bag specifically illustrated herein, different numbers of ports 16 may be provided. For example, a fourth port may be provided for permanent communication with tubing connecting to a second blood bag, for providing a double bag similar in function to the presently known double bags. Also, in similar manner, the bag of this invention may be utilized in conjunction with other multiple bag systems.

Figure 2:
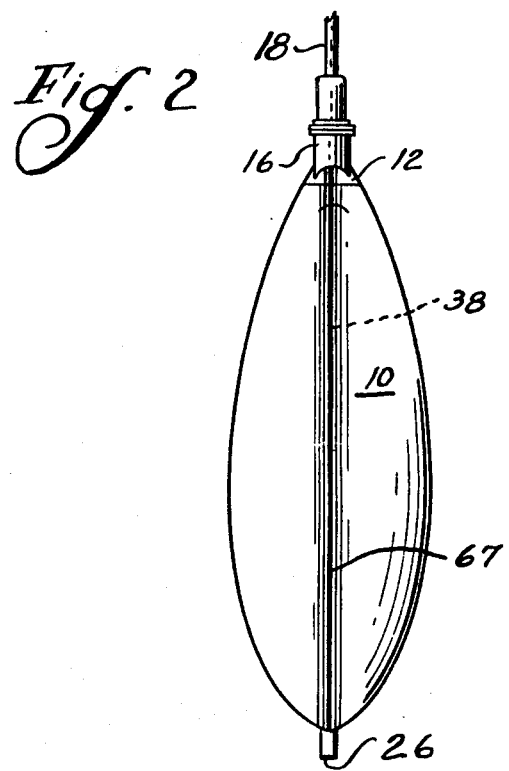
FIG. 2 is a side elevational view of the blood bag of FIG. 1, rotated 90 degrees from the view of FIG. 1 about the longitudinal axis thereof, with the blood donor tube broken away.

It may be seen from an inspection of FIGS. 1 and 2 that the circumference of the container wall section, for example sections 34 and 36, which are perpendicular to the longitudinal axis 38 of the chamber, are essentially all uniform except at the extreme ends of the container. This is accomplished by the fact that both ends of the container taper transversely to thin ends as illustrated in FIG. 2 while correspondingly increasing in lateral dimension as illustrated in FIG. 1, to achieve the generally uniform circumference of the chamber wall sections 34, 36 etc. throughout the great majority of this invention, despite the changing transverse and lateral dimensions as illustrated in FIGS. 1 and 2. This arrangement facilitates the flat collapse of the container despite the fact that it has been molded in oval shape, as further disclosed for example in Canadian patent No. 1,001,511.

The blood bag of this invention may be manufactured in the manner described in the patent application of David A. Winchell, et al. entitled "Method of Molding Flexible, Collapsible Containers," filed in July, 1977, being peripherally sealed about seal line 67.

The preferred compositions of this invention are particularly susceptible to blow molding in accordance with the method described in the co-pending application, to provide flexible, transparent, readily collapsible blood bags which are free of significant leachable components and which are highly compatible with the storage of units of whole blood and blood components.

The above has been offered for illustrative purposes only, and is not for the purpose of limiting the invention of this application, which is as defined in the claims below.

That which is claimed is:

1. A clear, flexible plastic formulation capable of being blow molded and autoclaved which comprises:
   (A) from 10 to 40 percent by weight of a polyolefin consisting essentially of propylene units;
   (B) from 40 to 85 percent by weight of a block copolymer, having thermoplastic rubber characteristics, consisting essentially of (1) a central block, comprising 50 to 85 percent by weight of the copolymer molecule, of a rubbery olefin polymer of generally equal proportions of ethylene and butylene units, and (2) terminal blocks of polystyrene; and (C) from 0 to 40 percent by weight of a softening agent selected from the group consisting of polyethylene, poly(ethylene-vinyl acetate) containing no more than 35 percent by weight of vinyl acetate units, and poly(ethylene-propylene) having no more than 60 percent by weight of propylene units, said plastic formulation being essentially free of liquid plasticizers.

2. The plastic formulation of claim 1 in which an effective, trace amount of a hindered phenolic antioxidant is present.

3. The plastic formulation of claim 2 in which an effective trace amount of 1,3,5-trimethyl-2,4,6-tris(3,5-di-tert-butyl-4-hydroxybenzyl) benzene is present as an antioxidant.

4. A flexible, collapsible, transparent blood bag made of the plastic formulation of claim 3.

5. The plastic formulation of claim 1 in which at least 10 percent by weight of ingredient (C) is present.

6. The plastic formulation of claim 5 in which ingredient (C) is poly(ethylene-vinyl acetate) containing at least 10 weight percent of vinyl acetate units.

7. A clear, flexible, collapsible container capable of being blow molded and autoclaved made from a plastic formulation which comprises:
(A) from 10 to 40 percent by weight of a polyolefin consisting essentially of propylene units;
(B) from 40 to 85 percent by weight of a block copolymer, having thermoplastic rubber characteristics, consisting essentially of (1) a central block, comprising 50 to 85 percent by weight of the copolymer molecule, of a rubbery olefin polymer of generally equal proportions of ethylene and butylene units, and (2) terminal blocks of polystyrene; and (C) from 0 to 40 percent by weight of a softening agent selected from the group consisting of polyethylene and poly(ethylene-vinyl acetate) containing no more than 35 percent by weight of vinyl acetate units, said plastic formulation being essentially free of liquid plasticizers.

8. The container of claim 7 in which an effective trace amount of a hindered phenolic antioxidant is present.

9. The container of claim 8 in which an effective trace amount of 1,3,5-trimethyl-2,4,6-tris(3,5-di-tert-butyl-4-hydroxybenzyl) benzene is present as an antioxidant.

10. The container of claim 7 in which at least 10 percent by weight of ingredient (C) is present.

11. The container of claim 10 in which ingredient (C) is poly(ethylene-vinyl acetate) containing at least 10 weight percent of vinyl acetate units.

12. A clear, flexible plastic formulation capable of being blow-molded and autoclaved which comprises:
(A) From 10 to 40 percent by weight of a polyolefin consisting essentially of propylene units;
(B) From 40 to 85 percent by weight of a block copolymer, having thermoplastic rubber characteristics, consisting essentially of (1) a central block, comprising 50 to 85 percent by weight of the copolymer molecule, of a rubbery olefin polymer of generally equal proportions of ethylene and butylene units, and (2) terminal blocks of polystyrene; and
(C) From 10 to 40 percent by weight of a softening agent comprising poly(ethylene-vinyl acetate) containing essentially from 28 to 35 percent by weight of vinyl acetate units, said plastic formulation being essentially free of liquid plasticizers.

13. The plastic formulation of claim 12 in which essentially 20 percent by weight of each of ingredients (A) and (C) are present, said ingredient (C) containing essentially 28 percent by weight of vinyl acetate units.

* * * * *